United States Patent
Morishita et al.

[11] Patent Number: 6,124,565
[45] Date of Patent: Sep. 26, 2000

[54] LASER CUTTING MACHINE

[75] Inventors: Akio Morishita, Inuyama; Minoru Tashiro, Kani; Tetsuichi Kitamoto, Aichi-ken, all of Japan

[73] Assignee: Yamazaki Mazak Kabushiki Kaisha, Japan

[21] Appl. No.: 09/290,050

[22] Filed: Apr. 12, 1999

[30] Foreign Application Priority Data

Apr. 13, 1998 [JP] Japan .................................. 10-117858

[51] Int. Cl.⁷ ................................................. B23K 26/00
[52] U.S. Cl. .............................. 219/121.67; 219/121.75; 219/121.84
[58] Field of Search ........................... 219/121.6, 121.67, 219/121.75, 121.84

[56] References Cited

U.S. PATENT DOCUMENTS

| | | | |
|---|---|---|---|
| 4,324,972 | 4/1982 | Furrer et al. | 219/121.84 |
| 4,406,940 | 9/1983 | Tsutsumi | 219/121.6 X |
| 5,298,716 | 3/1994 | Ogawa et al. | 219/121.67 |
| 5,948,292 | 9/1999 | Tanaka et al. | 219/121.67 X |

FOREIGN PATENT DOCUMENTS

| | | | |
|---|---|---|---|
| 3814985 | 12/1988 | Germany | 219/121.75 |
| 63-264291 | 11/1988 | Japan | 219/121.75 |
| 2-92483 | 4/1990 | Japan | 219/121.75 |
| 661887 | 8/1987 | Switzerland | 219/121.75 |

*Primary Examiner*—Gregory Mills
*Attorney, Agent, or Firm*—Trask, Britt & Rossa

[57] ABSTRACT

A laser cutting machine includes a driving apparatus for moving a laser head axially. An inner sleeve having a converging lens is coupled to the laser head. An outer sleeve having a nozzle is supported to move relative to the inner sleeve. A braking mechanism is arranged between the inner and outer sleeves to selectively lock the outer sleeve to the inner sleeve. An actuator moves a catch to selectively engage the outer sleeve, which holds the outer sleeve at a predetermined position. The driving apparatus moves the laser head when the outer sleeve is held at the predetermined position and the outer sleeve is released from the inner sleeve by the braking mechanism. This moves the outer sleeve relative to the inner sleeve and automatically adjusts the distance between the converging lens and the nozzle. This permits automation of a focal point position adjustment method.

19 Claims, 5 Drawing Sheets

Fig.5

LASER CUTTING MACHINE

BACKGROUND OF THE INVENTION

The present invention relates to laser cutting machines that cut workpieces with laser beams. More particularly, the present invention relates to a laser cutting machine that automatically adjusts the laser beam focal point position relative to a workpiece surface.

A typical laser cutting machine has a laser head, and a torch unit attached to the laser unit. The torch unit has a nozzle through which a laser beam is emitted toward a workpiece to cut the workpiece.

The laser beam is converged at a certain focal point relative to the surface of the workpiece. The optimal position of the focal point depends on various factors such as the material and thickness of the workpiece. The focal point position of the laser beam relative to the workpiece surface is adjusted prior to the cutting of the workpiece. The adjustment is normally carried out by changing the distance between the distal end of the nozzle and the focal point of the laser beam. In the prior art, the adjustment of the focal point position is carried out manually using an adjustment mechanism provided in the torch unit.

Therefore, the adjustment of the focal point position is burdensome. Furthermore, the adjustment must be performed manually. This is disadvantageous when automating the cutting of workpieces. To overcome such shortcomings, a servo control mechanism installed in the laser head, or torch unit, has been proposed to automatically adjust the focal point position. However, in such structure, the torch unit is required to include an actuator, such as a motor. This not only complicates the structure of the laser head but also increases the size and weight of the laser head.

SUMMARY OF THE INVENTION

Accordingly, it is an objective of the present invention to provide a laser cutting machine and a method for automatically adjusting the laser beam focal position that allows for automatic focal point position adjustment of the laser beam with a simplified laser head structure.

To achieve the above objective, the present invention provides a laser cutting machine including a support and a laser head supported by the support. The laser head is movable along a predetermined head axis. A driving mechanism moves the laser head along the head axis. A first torch member is arranged in the laser head. The first torch member moves integrally with the laser head. A second torch member is supported by the first torch member. The second torch member moves relative to the first torch member along the head axis. A laser beam emitting nozzle is attached to one of the first torch member and the second torch member. A converging lens is arranged in the other of the first torch member and the second torch member. A laser beam passage extends through the first and second torch members. A laser beam is transmitted through the laser beam passage, converged by the converging lens and emitted from the nozzle. A braking mechanism is provided between the first torch member and the second torch member to selectively lock the second torch member to the first torch member. A lock mechanism selectively engages the second torch member to hold the second torch member at a predetermined position on the head axis.

In a further aspect of the present invention, a method for adjusting the focal point of a laser beam emitted from a nozzle of a laser cutting machine is provided. The laser cutting machine includes a laser head movable along a predetermined head axis. The laser head includes first and second torch members, a converging lens, and the nozzle. The method includes holding the second torch member with an automatic lock mechanism, moving the laser head to adjust the distance between the converging lens and the nozzle, and locking the first torch member to the second torch member.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A laser cutting machine according to a first embodiment of the present invention will now be described with reference to FIGS. 1 to 4.

Figure 1:
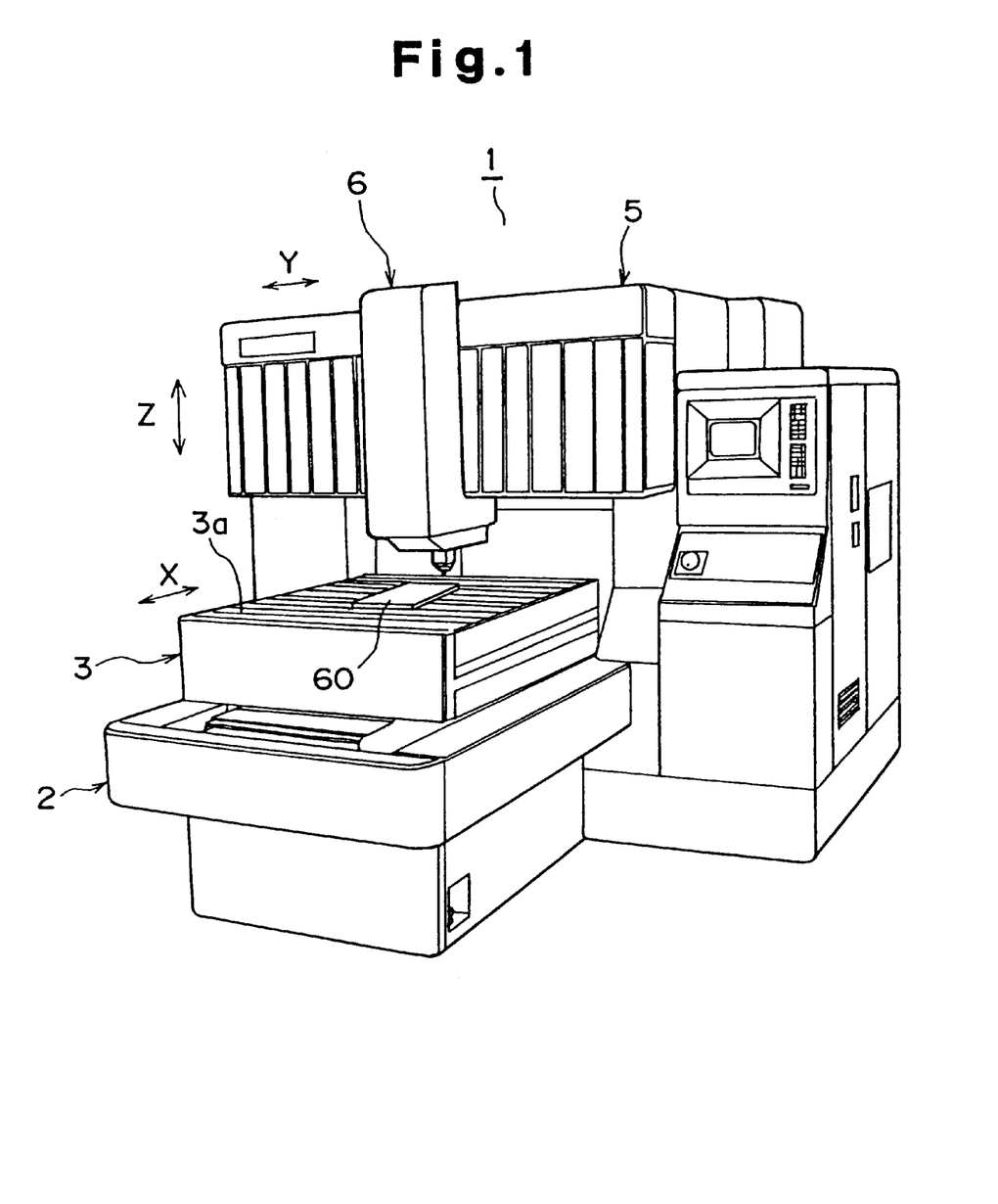
FIG. 1 is a perspective view showing a laser cutting machine according to a first embodiment of the present invention.

As shown in FIG. 1, a laser cutting machine 1 has a base 2. The base 2 supports a table 3 such that the table 3 is horizontally movable along an X axis. A workpiece support 3a is provided on the top surface of the table 3. A support bridge, or column 5, extending over the table 3 is supported on the base 2. The column 5 supports a saddle 6 (support) such that the saddle 6 is horizontally movable along a Y axis, which is perpendicular to the X axis.

Figure 2:
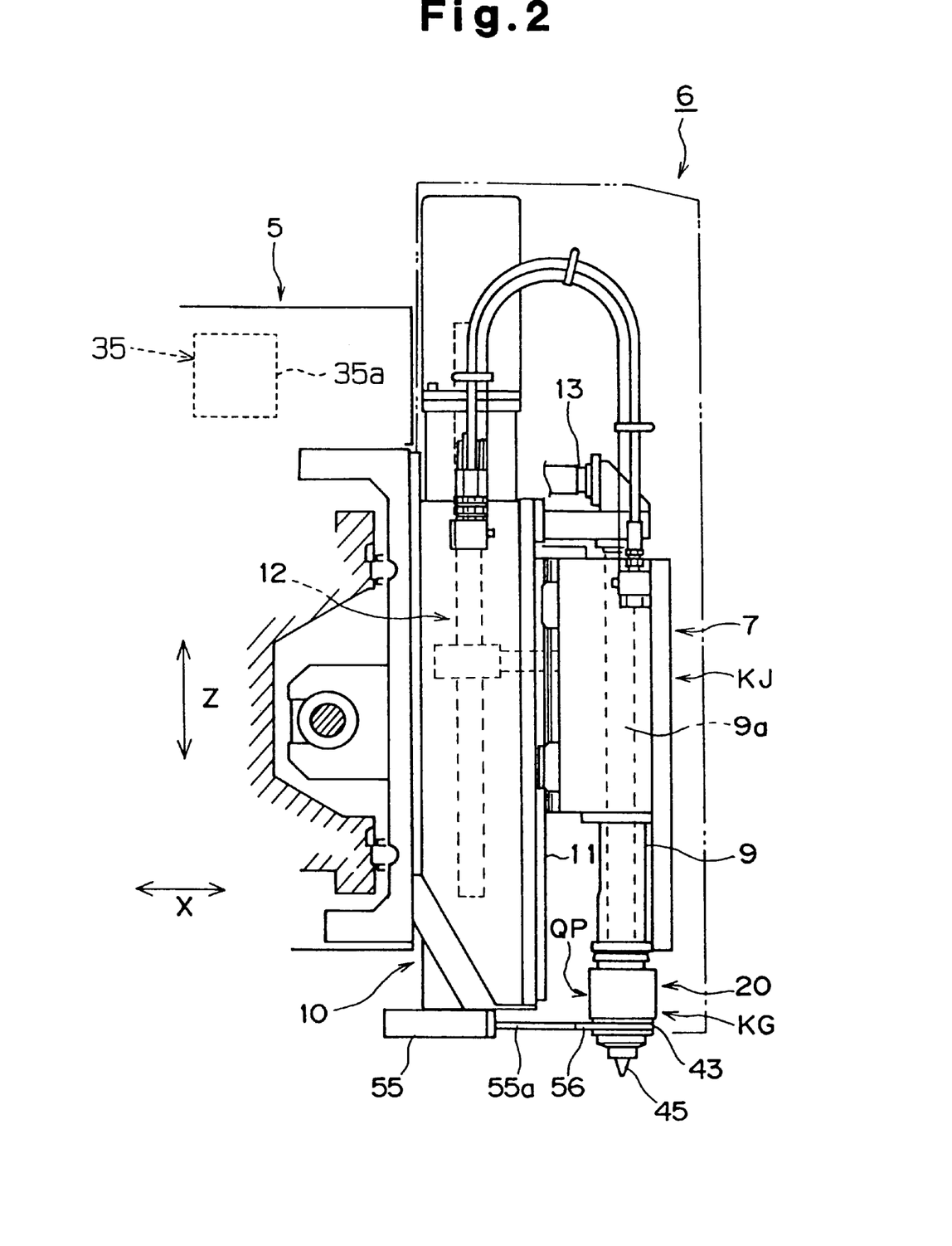
FIG. 2 is a partial side view showing a laser head and the interior of a saddle in the laser cutting machine of FIG. 1.

As shown in FIG. 2, the saddle 6 has a saddle base 10, which is moved with respect to the column 5 along the Y axis. A pair of guide rails 11 (or a single guide rail 11) extend vertically on the saddle base 10 along a Z axis. A laser head 7 is supported by the guide rails 11 such that the laser head 7 is movable along the Z axis. The saddle base 10 also has a driving apparatus 12, which includes a ball screw. The driving apparatus 12 moves the laser head 7 along the guide rails 11.

A laser oscillator (not shown) is housed in the column 5. The oscillator is connected to the laser head 7 by a laser beam tube 13 (partially shown in FIG. 2), which is known in the art. The laser head 7 includes a head beam tube 9, which is connected to the laser beam tube 13. The head beam tube 9 has an elliptic cross-section and extends along the Z axis. A torch unit 20 is located at the lower end of the head beam tube 9. A laser beam passage 9a extends through the head beam tube 9 to transmit a laser beam from the laser beam tube 13 to the torch unit 20.

Figure 3:
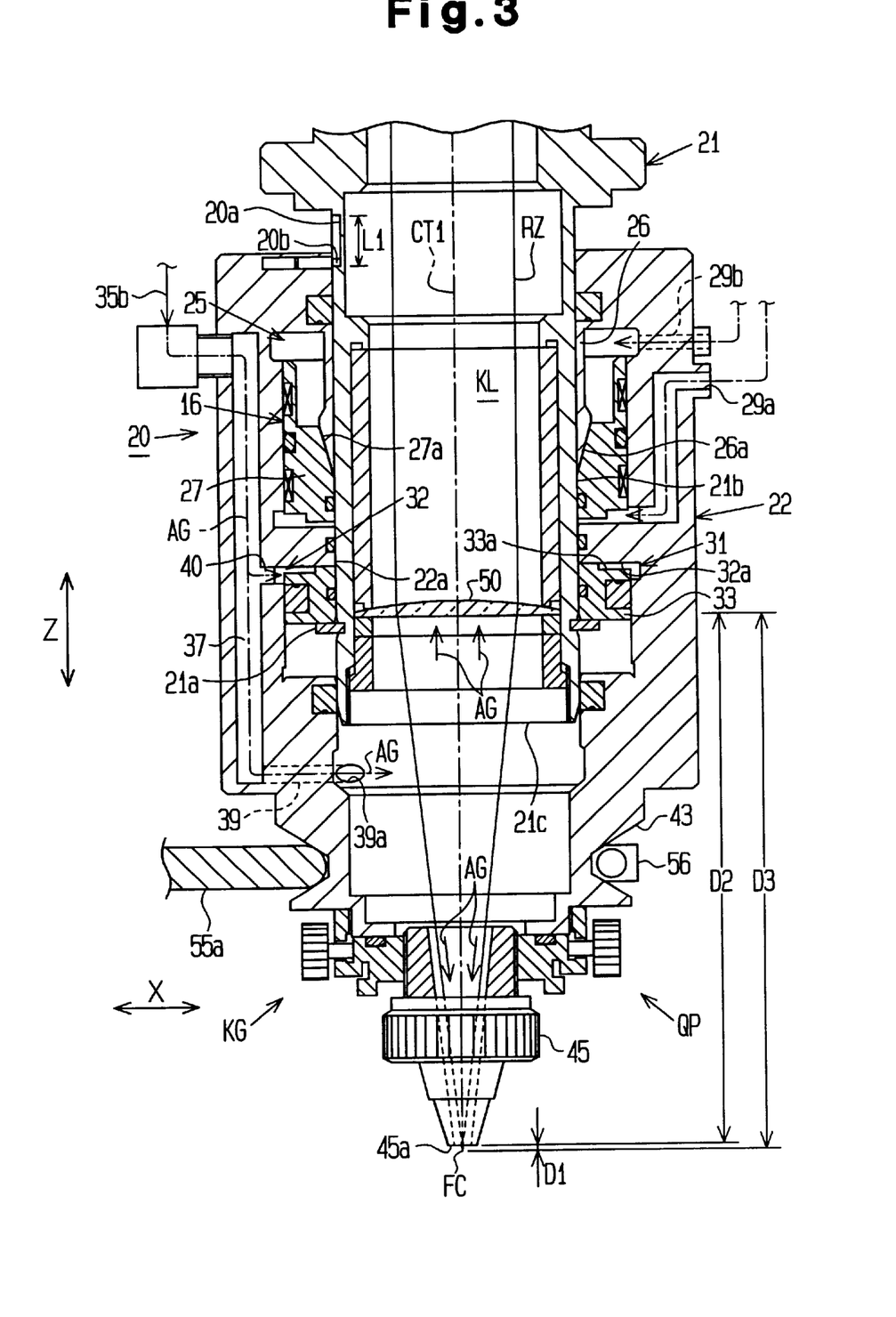
FIG. 3 is an enlarged cross-sectional view showing a torch unit located at the distal end of the laser head illustrated in FIG. 2. An outer sleeve is shown in its lowermost position.
Figure 4:
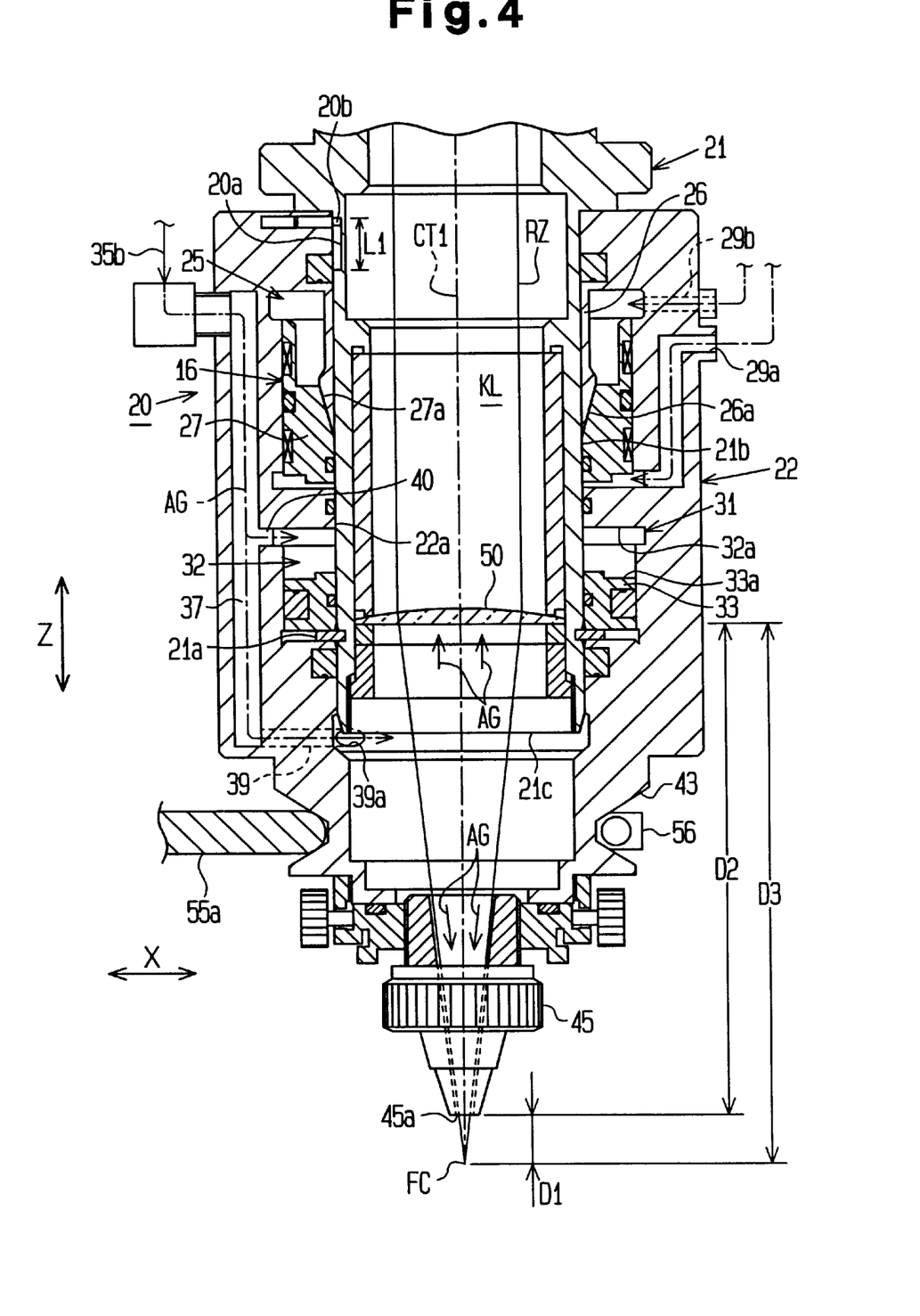
FIG. 4 is an enlarged cross-sectional view like FIG. 3 showing the outer sleeve in its uppermost position.

As shown in FIGS. 3 and 4, the torch unit 20 includes an inner sleeve 21, which is connected to the lower end of the head beam tube 9. The inner sleeve 21 is generally cylindrical and extends along the Z axis. A generally cylindrical outer sleeve 22 is fitted on the inner sleeve 21 such that the outer sleeve 22 is movable on the inner sleeve 21 along the Z axis. The inner sleeve 21 has an outer surface 21b in which a keyway 20a is formed. The keyway 20a extends in the direction of the Z axis by a predetermined length L1. The outer sleeve 22 has an inner surface 22a from which a key 20b projects to engage the keyway 20a. The key 20b moves in the keyway 20a along the Z axis within a range corresponding to length L1. Accordingly, the outer sleeve 22 moves relative to the inner sleeve 21 along the Z axis within a range corresponding to length L1 between an uppermost position, as shown in FIG. 4, and a lowermost position KG, as shown in FIG. 3.

A first annular chamber 25 is defined in the outer sleeve 22 adjacent to the outer surface 21b of the inner sleeve 21. The center axis of the first annular chamber 25 coincides with the center axes CT1 of the inner and outer sleeves 21, 22. The first annular chamber 25 is sealed between the inner and outer sleeves 21, 22. A clamp, or collet 26, is defined on the inner portion of the outer sleeve 22 at a location corresponding to the first annular chamber 25. The center axis of the collet 26 coincides with the center axis CT1. The collet 26 slides along the outer surface 21b of the inner sleeve 26 and extends downward from the top wall of the first annular chamber 25. Furthermore, a tapered surface 26a, the diameter of which decreases at lower positions, is defined on the lower, or distal end, of the collet 26. Equally spaced slits (not shown) extend vertically along the tapered surface 26a of the collet 26.

An annular first piston 27 is accommodated in the first annular chamber 25 such that it is movable along the Z axis. The first piston 27 has a tapered engaging surface 27a, which engages the tapered surface 26a of the collet 26. A pair of air conduits 29a, 29b extend through the outer sleeve 22 to deliver air, which drives the piston 27, to the first annular chamber 25. The air conduits 29a, 29b are connected to an air source (not source) located, for example, in the column 5.

When air is delivered to the first annular chamber 25 through the lower air conduit 29a, the first piston 27 moves upward causing the engaging surface 27a of the piston 27 to engage the tapered surface 26a of the collet 26. Consequently, the collet 26 clamps the inner sleeve 21 tightly and locks the outer sleeve 22 to the inner sleeve 21. When air is delivered to the first annular chamber 25 through the upper air conduit 29b, the first piston 27 moves downward, which separates the engaging surface 27a from the tapered surface 26a. This releases the inner sleeve 21 from the collet 26. Thus, the outer sleeve 22 becomes movable relative to the inner sleeve 21 along the Z axis. The collet 26, the first annular chamber 25, and the first piston 27 form a braking mechanism 16. The braking mechanism 16 keeps the outer sleeve 22 locked to the inner sleeve 21 during adjustment of the focal point position (described later).

A second annular chamber 32 is defined in the outer sleeve 22 adjacent to the outer surface 21b of the inner sleeve 21 and below the first annular chamber 25. The center axis of the second annular chamber 32 coincides with the center axes CT1 of the inner and outer sleeves 21, 22. The second annular chamber 32 is sealed between the inner and outer sleeves 21, 22. An annular second piston 33 is accommodated in the second annular chamber 32 such that it is movable along the Z axis. The upper surface of the second piston 33 defines a pressure receiving surface 33a, while the top wall of the second annular chamber 32, which faces the upper surface of the second piston 33, defines a further pressure receiving surface 32a. The second annular chamber 32 and the second piston 33 form a pressure balancing mechanism 31. A ring-like stopper 21a is fitted to the outer surface 21b of the inner sleeve 21 in the second annular chamber 32 at a position lower than the second piston 33.

As shown in FIG. 2, an assist gas apparatus 35 is arranged in the column 5. The assist gas apparatus 35 includes a gas cylinder 35a, which is a source of assist gas, and a gas passage 35b (FIGS. 3 and 4), which extends from the gas cylinder 35a to deliver assist gas to the torch unit 20. As shown in FIGS. 3 and 4, a gas conduit 37, which forms part of the gas passage 35b, extends through the outer sleeve 22. The gas conduit 37 includes a first branch 39 and a second branch 40, which extend from the downstream portion of the gas conduit 37.

The first branch 39 has an outlet 39a, which is located in the inner surface 22a of the outer sleeve 22 below the second annular chamber 32. FIG. 4 illustrates the outer sleeve 22 located at its uppermost position relative to the inner sleeve 21. In this state, the lower half of the outlet 39a is arranged below the lower end 21c of the inner sleeve 21. Where the outlet 39a is located, the diameter of the inner surface 22a of the outer sleeve 22 is larger than that of the outer surface 21b of the inner sleeve 21 to create an annular space. Therefore, the outlet 39a is never closed by the outer surface 21b of the inner sleeve 21 regardless of where the outer sleeve 22 is located relative to the inner sleeve 21 along the Z axis. The second branch 40 leads into the top part of the second annular chamber 32, that is, the part of the second annular chamber 32 that is above the second piston 33.

A laser beam passage KL, which is connected to the laser beam passage 9a of the head beam tube 9, extends through the inner sleeve 21. A converging lens 50, which is fixed within the inner sleeve 21, is arranged in the laser beam passage 9a. A nozzle 45 is attached to the lower end of the outer sleeve 22. The laser beam passage KL extends through the outer sleeve 22 and into the nozzle 45 from the lower end 21c of the inner sleeve 21. A laser beam RZ transmitted from the laser beam passage 9a travels downward through the laser beam passage KL. The converging lens 50 converges the laser beam RZ as shown in FIG. 4. The converging laser beam RZ is then emitted from the distal end 45a of the nozzle 45.

The laser cutting machine 1 includes an automatic lock mechanism for restraining the outer sleeve 22. As shown in FIG. 2, the lock mechanism includes an actuator 55 coupled to the lower end of the saddle base 10. The actuator 55 is, for example, a cylinder or a solenoid and may be supported by parts other than the saddle base 10 such as the column 5. The actuator 55 includes a rod 55a which extends in the direction of the X axis. The rod 55a is movable along the X axis and has a substantially U-shaped (as viewed from above) catch 56 at its distal end.

FIG. 2 shows the laser head 7 arranged at a predetermined reference position KJ on the Z axis. Furthermore, the torch unit 20 is shown in FIG. 2 with its outer sleeve 22 located at the lowermost position KG relative to the inner sleeve 21. In this state, the outer sleeve 22 is arranged at a predetermined engaging position QP on the Z axis. As shown in FIGS. 3 and 4, a groove 43 having a generally V-shaped cross-section extends along the outer surface of the outer sleeve 22. As shown in FIGS. 2 and 3, the groove 43 is horizontally aligned with the catch 56 of the rod 55a when the outer sleeve 22 is located at the engaging position QP.

Sheet-like workpieces are cut by the laser cutting machine 1. As shown in FIG. 1, a sheet-like workpiece 60 is held on the workpiece support 3a of the table 3. In this state, the table 3 is controlled to move along the X axis, while the saddle 6 is controlled to move along the Y axis to cut the workpiece 60 by emitting the laser beam RZ toward the workpiece 60 from the distal end 45a of the nozzle 45. When the workpiece 60 is being cut, the laser head 7 is controlled by the driving apparatus 12 to move along the Z axis such that the distance between the distal end 45a of the nozzle 45 and the surface of the workpiece 60 remains constant at a predetermined value.

The laser beam RZ is transmitted from the laser oscillator (not shown) to the laser head 7 through the laser beam tube 13 (FIG. 2) and then further transmitted to the torch unit 20 through the head beam tube 9. As shown in FIGS. 3 and 4, the laser beam RZ then travels through the laser beam passage KL in the torch unit 20. The laser beam RZ is converged by the converging lens 50 and emitted from the distal end 45a of the nozzle 45.

When the laser beam RZ is emitted toward the workpiece 60, assist gas AG is simultaneously blown toward the workpiece 60. In other words, the assist gas apparatus 35 sends assist gas AG to the torch unit 20. The assist gas AG flows through the gas conduit 37 in the outer sleeve 22 and the outlet 39a of the first branch 39 to enter the interior of the outer sleeve 22, or the laser beam passage KL. The assist gas AG then flows through the nozzle 45 and out of the nozzle distal end 45a toward the workpiece 60.

The focal position, or focal point FC, of the laser beam RZ relative to the surface of the workpiece 60 must be changed in accordance with the material and thickness of the workpiece. Accordingly, as shown in FIGS. 3 and 4, the distance D1 between the distal end 45a of the nozzle 45 and the focal point FC of the laser beam RZ is adjusted to change the focal point FC of the laser beam RZ relative to the workpiece 60. In other words, the distance between the distal end 45a of the nozzle 45 and the surface of the workpiece 60 is kept constant at a predetermined value when the workpiece 60 is cut. Furthermore, the distance D3 between the converging lens 50 and the focal point FC of the laser beam RZ is fixed. Thus, the distance D1 is changed by changing the distance D2 between the converging lens 50 and the distal end 45a of the nozzle 45.

The position of the focal point FC relative to the surface of the workpiece 60 is adjusted in the following manner. Prior to the cutting of the workpiece 60, the laser head 7 is controlled by the driving apparatus 12 to move in the direction of the Z axis such that the laser head 7 is arranged at the predetermined reference position KJ, as shown in FIG. 2. Air is then sent into the first annular chamber 25 through the upper air conduit 29b to move the first piston 27 downward. This separates the engaging surface 27a of the first piston 27 from the tapered surface 26a of the collet 26. Therefore, the collet 26 releases the inner sleeve 21. In this state, the outer sleeve 22 descends relative to the inner sleeve 21 due to its own weight. As shown in FIG. 3, when the key 20b contacts the lower end of the keyway 20a, the outer sleeve 22 is located at the lowermost position KG relative to the inner sleeve 21.

Then, the actuator 55 is actuated to extend the rod 55a. Since the groove 43 of the outer sleeve 22, which is located at the engaging position QP, is horizontally aligned with the catch 56, the projection of the rod 55a engages the catch 56 with the groove 43. As a result, the actuator 55 connects the outer sleeve 22 and the nozzle 45 to the saddle base 10. In this state, the outer sleeve 22 and the nozzle 45 are locked along the Z axis.

The actuator 55 may also be installed in the column 5. In such case, the saddle 6 is first moved along the Y axis to a predetermined position. Subsequently, the same procedures as described above are carried out. The outer sleeve 22 is then moved to the engaging position QP to permit engagement of the catch 56 with the groove 43. Then, the actuator 55 connects the outer sleeve 22 and the nozzle 45 to the column 5 to lock and prevent movement of the outer sleeve 22 and the nozzle 45 in the direction of the Z axis.

As shown in FIG. 3, when the outer sleeve 22 is located at the lowermost position KG relative to the inner sleeve 21, the distance D2 between the converging lens 50 and the distal end 45a of the nozzle 45 is maximum. From this state, the outer sleeve 22 is moved toward the uppermost position relative to the inner sleeve 21 to gradually decrease the distance D2 until the distance D1 between the distal end 45a of the nozzle 45 and the focal point FC of the laser beam RZ becomes equal to a desired value. This adjusts the focal point FC of the laser beam RZ relative to the surface of the workpiece 60 to an optimal position.

More specifically, from the state shown in FIG. 3, the laser head 7 is moved downward along the Z axis by the driving apparatus 12. Since the outer sleeve 22 and the nozzle 45 are locked to the saddle base 10, the inner sleeve 21 moves downward relative to the outer sleeve 22 as the laser head 7 descends. This moves the converging lens 50, which is held at a fixed position in the inner sleeve 21, toward the nozzle 45. In other words, the distance D2 between the converging lens 50 and the distal end 45a of the nozzle 45 decreases gradually. The descent of the laser head 7 is stopped when the distance D2 becomes equal to a value corresponding to the desired distance D1.

The distance D2 between the converging lens 50 and the distal end 45a of the nozzle 45 when the outer sleeve 22 is located at the lowermost position KG relative to the inner sleeve 21 is predetermined. Furthermore, the driving apparatus 12 accurately moves the laser head 7 along the Z axis. Therefore, the distance D1 is adjusted accurately when adjusting the distance D2.

After adjusting the distance D1 to the predetermined value, air is sent into the first annular chamber 25 through the lower air conduit 29a to move the first piston 27 upward. This engages the engaging surface 27a of the piston 27 with the tapered surface 26a of the collet 26. Thus, the collet 26 tightly clamps the inner sleeve 21 and locks the outer sleeve 22 to the inner sleeve 21. The actuator 55 then retracts the rod 55a and separates the catch 56 of the rod 55a from the groove 43 of the outer sleeve 22. The outer sleeve 22 and the nozzle 45, together with the inner sleeve 21, moves integrally with the laser head 7 along the Z axis.

The workpiece 60 is cut in this state. During the cutting of the workpiece 60, the distance between the distal end 45a of the nozzle 45 and the surface 60 of the workpiece 60 is held constant regardless of the focal point adjustment. However, the cutting of the workpiece 60 starts after adjustment of the distance D1 between the distal end 45a of the nozzle 45 and the focal point FC of the laser beam RZ. Thus, the workpiece 60 is cut with the focal point FC of the laser beam RZ relative to the surface of the workpiece 60 set at a position that optimally corresponds to the material and thickness of the workpiece 60.

As described above, the focal point adjustment need not be performed manually in the laser cutting machine 1 of this embodiment. This permits a higher degree of automation.

Additionally, the inner sleeve 21 and the outer sleeve 22 are moved relatively along the Z axis during the focal point adjustment. The inner and outer sleeves 21, 22 are moved relatively by the driving apparatus 12, which moves the laser head 7 in the direction of the Z axis. In other words, the driving apparatus 12 moves the laser head 7 and adjusts the focal point. Therefore, an actuator for exclusively moving the inner and outer sleeves 21, 22 relatively to each other need not be provided in the torch unit 20. This simplifies the structure of the torch unit 20 and provides a lighter and more compact torch unit 20.

Assist gas AG is sent into the interior of the outer sleeve 22 through the outlet 39a of the first passage 39. The assist gas AG is not only blown toward the workpiece 60 from the distal end 45a of the nozzle 45 but is also used to enter the inner sleeve 21 and apply upward pressure to the converging lens 50. The assist gas AG also applies downward pressure to the nozzle 45 and the outer sleeve 22. The pressure applied to the inner sleeve 21 is received by the laser head 7 by means of the head beam tube 9. The pressure applied to the nozzle 45 and the outer sleeve 22 is basically received by the inner sleeve 21 by means of the braking mechanism 16 arranged between the inner and outer sleeves 21, 22.

The assist gas AG delivered to the gas conduit 37 in the outer sleeve 22 is sent into the second annular chamber 32 through the second branch 40. Thus, the pressure of the assist gas AG is applied to the pressure receiving surface 32a of the second annular chamber 32 and the pressure receiving surface 33a of the second piston 33. The assist gas AG acts to move the second piston 33 downward. A stopper 21a is fixed to the inner sleeve 21 under the second piston 33. Thus, the downward pressure applied to the second piston 33 is received by the inner sleeve 21 by way of the stopper 21a. Accordingly, the assist gas AG sent into the second annular chamber 32 applies pressure to the receiving surface 32a and forces the outer sleeve 22 upward. The force of the upward pressure acting on the outer sleeve 22 offsets the downward force acting on the nozzle 45 and the outer sleeve 22. In other words, the pressure balancing mechanism 31, which includes the second annular chamber 32 and the second piston 33, minimizes the force produced by the assist gas AG that moves the outer sleeve 22 along the Z axis relative to the inner sleeve 21. Accordingly, the pressure of the assist gas AG, which acts on the outer sleeve 22, need not be taken into consideration when determining the force required by the braking mechanism 16 to lock the inner and outer sleeves 21, 22. Thus, the braking mechanism 16 can lock the inner and outer sleeves 21, 22 with a small force. This minimizes the size of the braking mechanism 16.

The braking mechanism 16 includes the collet 26, and the first piston 27, which engages the collet 26. The braking mechanism 16 also functions to absorb impact produced, for example, when the distal end 45a of the nozzle 45 collides against a workpiece while moving the laser head 7 toward the workpiece. More specifically, if the distal end 45a of the nozzle 45 collides against a workpiece, the impact of the collision causes the collet 26 to release the first piston 27 since the diameter of the tapered surface 27a decreases at lower positions. Accordingly, the clamping force applied to the inner sleeve 21 by the outer sleeve 22 is either nullified or decreased. Therefore, when the nozzle 45 collides against a workpiece, the nozzle 45 and the outer sleeve 22 move upward relative to the inner sleeve 21 to absorb the impact produced by the collision. This minimizes the damage inflicted on the nozzle 45 and the workpiece during a collision.

As shown in FIGS. 3 and 4, the second piston 33 is connected to the inner sleeve 21 by the stopper 21a. However, the second piston 33 may be fixed to or formed integrally with the inner sleeve 21 instead. Further, the second annular chamber 32 is provided in the outer sleeve 22, as shown in FIGS. 3 and 4, but may be provided in the inner sleeve 21 instead. In this case, the second piston 33 is connected to the outer sleeve 22.

A second embodiment according to the present invention will now be described with reference to FIGS. 1 to 4. The description will center on parts differing from the first embodiment. The laser cutting machine of the second embodiment is substantially identical to that of the first embodiment except for a torch unit 200. Thus, except for the torch unit 200, to avoid a redundancy, like or same reference numerals are given to those components that are the same as the corresponding components illustrated in FIGS. 1 to 4.

Figure 5:
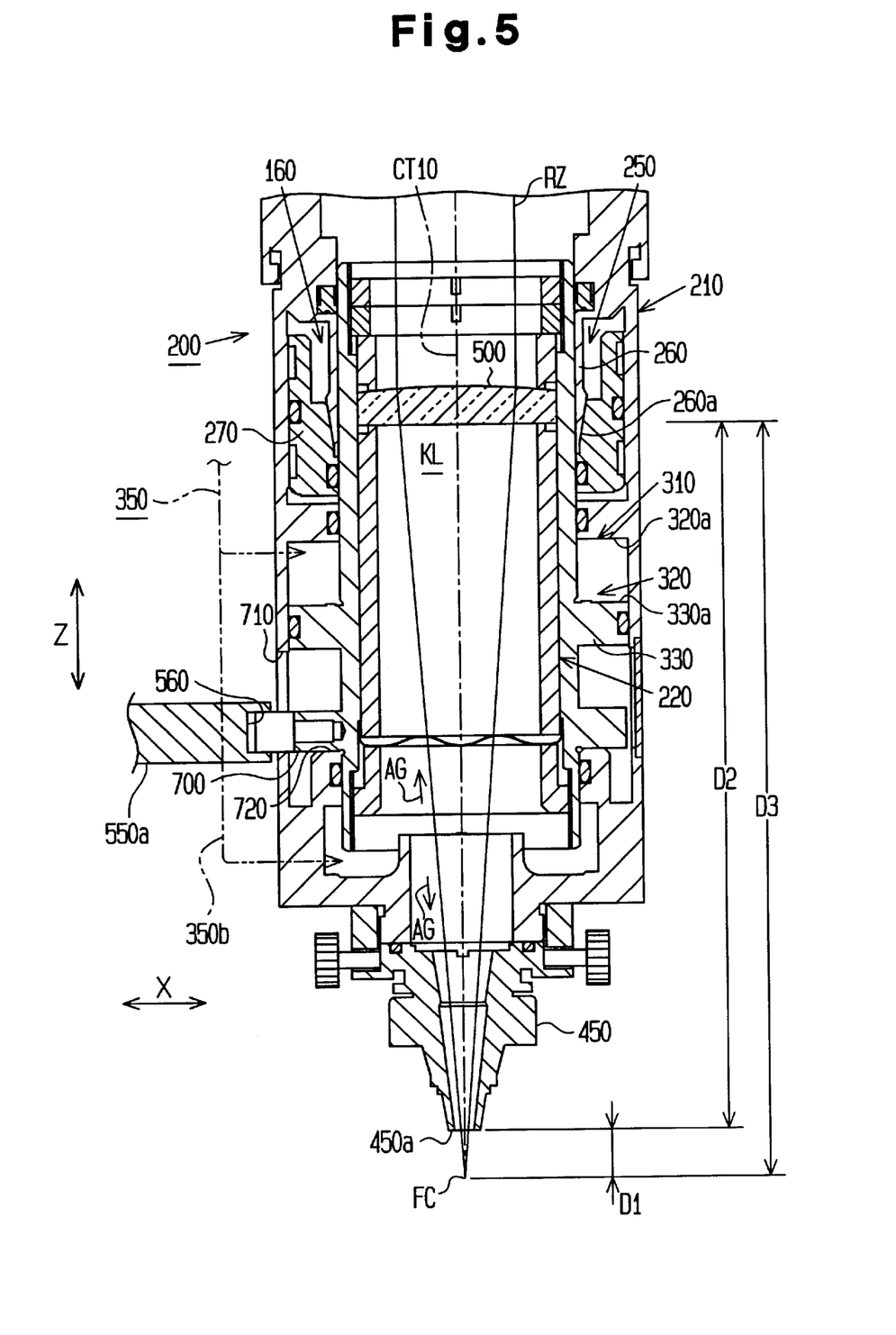
FIG. 5 is a cross-sectional view showing a torch unit employed in a laser cutting machine according to a second embodiment of the present invention, and the inner sleeve is shown in its lowermost position.

The torch unit 200 shown in FIG. 5 is located at the lower end of the head beam tube 9, which is illustrated in FIG. 2. The torch unit 200 has a cylindrical outer sleeve 210, which extends along the Z axis and which is connected to the lower end of the head beam tube 9. A cylindrical inner sleeve 220, which also extends along the Z axis, is inserted into the outer sleeve 210 and supported such that the inner sleeve 220 is movable along the Z axis relative to the outer sleeve 210. The axis of the outer and inner sleeves 210, 220 is denoted by CT10.

The converging lens 500 is fixed to the inner surface of the inner sleeve 220. The outer sleeve 210 extends further downward from the lower end of the inner sleeve 220. A nozzle 450 is attached to the lower end of the outer sleeve 210. The laser beam passage KL, which is connected to the laser beam passage 9a (FIG. 2), extends through the inner sleeve 220, the outer sleeve 210, and the nozzle 450. The laser beam RZ from the laser beam passage 9a is transmitted downward to be converged by the converging lens 500 and emitted from the distal end 450a of the nozzle 450.

A braking mechanism 160, which is substantially the same as the braking mechanism 16 illustrated in FIGS. 3 and 4, is arranged between the outer sleeve 210 and the inner sleeve 220. That is, the braking mechanism 160 includes a first annular chamber 250, which is defined in the inner portion of the outer sleeve 210, a collet 260 extending downward from the top wall of the first annular chamber 250, and a cylindrical first piston 270 arranged in the first annular chamber 250. The collet 260 has a tapered surface 260a. The first piston 270 is supported such that it can engage the tapered surface 260a of the collet 260. A pair of air conduits (not shown) extend through the outer sleeve 210 like the air conduits 29a, 29b illustrated in FIGS. 3 and 4.

A rod-like engaging projection 700 extends from the outer surface of the inner sleeve 220 in a direction perpendicular to the axis CT10 of the inner sleeve 220. The outer sleeve 210 has a notch 710 extending in a direction parallel to the Z axis. The engaging projection 700 projects from the outer sleeve 210 through the slit 710. The engaging projection 700 is also movable along the slit 710 in the Z axis within a range determined by the length of the slit 710. Therefore, the movement range of the inner sleeve 220 relative to the outer sleeve 210 along the Z axis between the uppermost position, which is shown in FIG. 5, and the lowermost position is determined by the length of the slit 710.

A stopper 720 is formed on the inner portion of the outer sleeve 210 below the engaging projection 700. As shown in FIG. 5, when the engaging projection 700 abuts against the lower end of the slit 710 (i.e., when the inner sleeve 220 is located at the lowermost position relative to the outer sleeve 210), the engaging projection 700 abuts against the stopper 720.

Although not shown in FIG. 5, an actuator similar to the actuator 55 shown in FIG. 2, is installed in the saddle base 10 (or the column 5). The actuator has a rod 550a, which extends parallel to the X axis. A catch 560, which engages the engaging projection 700, is defined on the distal end of the rod 550a. When the laser head 7 is arranged at a predetermined reference position, as shown in FIG. 2, and the inner sleeve 220 is arranged at the lowermost position relative to the outer sleeve 210, the inner sleeve 330 is located at an engaging position. In this state, the engaging projection 700 is horizontally aligned with the catch 560 of the rod 550a.

The laser cutting machine of this embodiment also has a pressure balancing mechanism 310, which corresponds to the pressure balancing mechanism 31 illustrated in FIGS. 3 and 4. A second annular chamber 320 is arranged at the inner side of the outer sleeve 210. An annular second piston 330 is formed integrally with the outer surface of the inner sleeve 220 and located in the second annular chamber 320. The upper surface of the second piston 330 defines a pressure receiving surface 330a, while the top wall of the second annular chamber 320, which faces the upper surface of the second piston 330, defines a further pressure receiving surface 320a.

The laser cutting machine of this embodiment further includes an assist gas apparatus 350, which corresponds to the assist gas apparatus 35 illustrated in FIGS. 2 and 3. The assist gas apparatus 350 is connected to the outer sleeve 210 by a gas passage 350b (shown schematically by the chained lines in FIG. 5). Assist gas AG is delivered to the interior of the outer sleeve 210 and the second annular chamber 320 through the gas passage 350b.

In this embodiment, the focal point FC of the laser beam RZ relative to the surface of the workpiece is carried out in the following manner. Prior to the cutting of the workpiece 60, the laser head 7 (FIG. 2) is arranged at a predetermined reference position. The braking mechanism 160 then separates the first piston 270 from the collet 260 to release the inner sleeve 21 from the collet 26. In such state, the inner sleeve 220 descends relative to the outer sleeve 210 due to its own weight. As shown in FIG. 5, when the engaging projection 700 abuts against the lower end of the slit 710 and the stopper 720, the inner sleeve 220 is located at the lowermost position relative to the outer sleeve 210. In other words, the inner sleeve 220 is located at the predetermined engaging position along the Z axis. The rod 550a is then projected so that the catch 560 engages the projection 700. This connects the inner sleeve 220 to the saddle base 10 (or the column 5), shown in FIG. 2, and locks the inner sleeve 220 in the Z axis.

When the inner sleeve 220 is located at the lowermost position relative to the outer sleeve 210 as shown in FIG. 5, the distance D2 between the converging lens 500 and the distal end 450a of the nozzle 450 is minimum. From this state, the distance D2 is gradually increased by moving the inner sleeve 220 toward the uppermost position relative to the outer sleeve 210 until the distance D1 between the distal end 450a of the nozzle 450 and the focal point FC of the laser beam RZ becomes equal to the desired value. This adjusts the focal point FC of the laser beam RZ relative to the surface of the workpiece to the optimal position.

More specifically, the laser head 7 is moved downward along the Z axis from the state shown in FIG. 5. Since the inner sleeve 220 is locked to the saddle base 10 (or the column 5), the outer sleeve 210 moves downward relative to the inner sleeve 220 as the laser head 7 descends and separates the nozzle 450 from the converging lens 500, which is fixed to the inner sleeve 220. In other words, the distance D2 between the converging lens 500 and the distal end 450a of the nozzle 450 is increased gradually. The descent of the laser head 7 is stopped when the distance D2 becomes equal to a value that corresponds to the desired distance D1.

After the distance D1 is adjusted to the desired value, the braking mechanism 160 locks the inner sleeve 220 to the outer sleeve 210. The rod 550a is retracted to separate the catch 560 from the engaging projection 700. The workpiece is then cut in the same manner as the embodiment illustrated in FIGS. 1 to 4.

Accordingly, like the embodiment illustrated in FIGS. 1 to 4, the focal point adjustment need not be performed manually in this embodiment. This permits greater automation of cutting. In addition, the driving apparatus 12 (FIG. 2), which drives the laser head 7 along the Z axis, moves the inner sleeve 220 relative to the outer sleeve 210. Therefore, an actuator for exclusively moving one sleeve relative to the other need not be provided in the torch unit 200. This simplifies the structure of the torch unit 200 and provides a lighter and more compact torch unit 200.

Assist gas AG is sent into the interior of the outer sleeve 210 and blown toward the workpiece from the distal end 450a of the nozzle 450. The assist gas AG also applies an upward pressure to the inner sleeve 220 by way of the converging lens 500. Furthermore, the pressure of the assist gas AG sent into the second annular chamber 320 is applied to the pressure receiving surface 330a of the second piston 330 to force the inner sleeve 220 downward. Accordingly, the pressure balancing mechanism 310, which includes the second annular chamber 320 and the second piston 330, offsets the force produced by the assist gas AG that urges the inner sleeve 220 relative to the outer sleeve 210 along the Z axis. Therefore, like the embodiment illustrated in FIGS. 1 to 4, the force required by the braking mechanism 160 is small. This allows a smaller braking mechanism 160 to be used.

In this embodiment, the inner sleeve 220 is movable relative to the outer sleeve 210 along the Z axis. Thus, if the braking mechanism 160 accidentally releases the outer and inner sleeves 210, 220 from each other, the inner sleeve 220 just moves in the outer sleeve 210. Thus, the nozzle 450, which is attached to the outer sleeve 210, is prevented from falling and colliding against the workpiece.

In the embodiments illustrated in FIGS. 1 to 5, the catch 56 (or catch 560) is engaged with the outer sleeve 22 (or inner sleeve 220) with the outer sleeve 22 (or inner sleeve 220) located at the lowermost position relative to the inner sleeve 21 (or outer sleeve 210). However, a memory may be provided instead to store the coordination of the laser head 7 in the Z axis when the laser head 7 completes adjustment of the focal point. During the subsequent focal point adjustment, the laser head 7 is arranged at the Z axis coordination previously stored in the memory. In this state, the groove 43 (or engaging projection 700) of the outer sleeve 22 (or the inner sleeve 220) is aligned horizontally with the catch 56 (or catch 560) of the actuator. Therefore, the actuator is actuated to engage the catch 56 (or catch 560) with the groove 43 (or engaging projection 700) before the braking mechanism 16 (or braking mechanism 160) releases the inner sleeve 21 (or outer sleeve 210) and the outer sleeve 22 (or inner sleeve 220) from each other.

Afterward, the braking mechanism 16 (or braking mechanism 160) releases the inner sleeve 21 (or outer sleeve 210) and the outer sleeve 22 (or inner sleeve 220) from each other to permit relative movement of the inner sleeve 21 (or outer sleeve 210) and the outer sleeve 22 (or inner sleeve 220). The amount of relative movement is based on the distance D2 prior to the releasing action of the braking mechanism 16 (or braking mechanism 160) and is determined such that the distance D2 becomes equal to a value corresponding to the presently desired distance D1.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A laser cutting machine comprising:

a support;

a laser head supported by the support, wherein the laser head is movable along a predetermined head axis;

a driving mechanism for moving the laser head along the head axis;

a first torch member arranged in the laser head, wherein the first torch member moves integrally with the laser head;

a second torch member supported by the first torch member, wherein the second torch member moves relative to the first torch member along the head axis;

a laser beam emitting nozzle attached to one of the first torch member and the second torch member;

a converging lens arranged in the other of the first torch member and the second torch member, wherein a laser beam passage extends through the first and second torch members, and wherein a laser beam is transmitted through the laser beam passage, converged by the converging lens and emitted from the nozzle;

a braking mechanism provided between the first torch member and the second torch member to selectively lock the second torch member to the first torch member; and a lock mechanism for selectively engaging the second torch member to hold the second torch member at a predetermined position on the head axis.

2. The laser cutting machine according to claim 1, wherein the first torch member includes an inner sleeve extending along the head axis, the second torch member includes an outer sleeve surrounding the inner sleeve, the nozzle is attached to one end of the outer sleeve, and the converging lens is supported by the inner sleeve.

3. The laser cutting machine according to claim 1, wherein the first torch member includes an outer sleeve extending along the head axis, the second torch member includes an inner sleeve fitted inside the outer sleeve, the nozzle is attached to one end of the outer sleeve, and the converging lens is supported by the inner sleeve.

4. The laser cutting machine according to claim 1, wherein one of the first and second torch members includes an inner sleeve extending along the head axis, and the other includes an outer sleeve surrounding the inner sleeve, wherein the braking mechanism includes:

an annular chamber defined in the outer sleeve extending about the inner sleeve, wherein an actuating fluid is sent into the annular chamber;

a clamp arranged on the outer sleeve to grip the inner sleeve at a location corresponding to the annular chamber;

an annular piston arranged in the annular chamber, wherein the piston is moved by the actuating fluid in the annular chamber between a first position and a second position, wherein the piston engages the clamp when moved to the first position, which causes the clamp to grip the inner sleeve, and wherein the piston causes the clamp to release the inner sleeve when the piston is moved to the second position.

5. The laser cutting machine according to claim 4, wherein the clamp is a collet having a tapered surface that engages the piston.

6. The laser cutting machine according to claim 1, wherein the driving mechanism moves the laser head to adjust the distance between the converging lens and the nozzle while the lock mechanism holds the second torch member at the predetermined position and the braking mechanism releases the first torch member from the second torch member.

7. The laser cutting machine according to claim 6, wherein the second torch member moves relative to the first torch member between an uppermost position and a lowermost position, the second torch member being moved to the lowermost position by its own weight when the braking mechanism releases the first torch member from the second torch member, and the lock mechanism restrains the second torch member when the second torch member is located at the lowermost position.

8. The laser cutting machine according to claim 1, wherein the lock mechanism includes an actuator and a catch, wherein the actuator moves the catch toward and away from the second torch member.

9. The laser cutting machine according to claim 8, wherein the lock mechanism is fixed to the support.

10. The laser cutting machine according to claim 1 further comprising:

a gas supplying apparatus for supplying the interior of the nozzle with assist gas, the assist gas being discharged from the nozzle, wherein the assist gas in the nozzle urges the second torch member in a first direction relative to the first torch member along the head axis; and a pressure balancing mechanism arranged between the first and second torch members, wherein the balancing mechanism uses the assist gas to urge the second torch member in a second direction, which is opposite the first direction.

11. The laser cutting machine according to claim 10, wherein the assist gas sent into the nozzle from the gas supplying apparatus urges the second torch member in a direction that separates the nozzle from the converging lens, and wherein the pressure balancing mechanism uses the assist gas from the gas supplying apparatus to urge the second torch member in a direction that moves the nozzle toward the converging lens.

12. The laser cutting machine according to claim 11, wherein the pressure balancing mechanism includes:

a pressure chamber arranged in one of the first and second torch members, the assist gas being drawn into the pressure chamber from the gas supplying apparatus, wherein the pressure chamber has a pressure receiving surface for receiving the pressure of the assist gas; and a piston arranged in the pressure chamber and connected to the other of the first and second torch members, wherein the piston has a surface facing the pressure receiving surface.

13. A laser cutting machine comprising:

a support;

a laser head supported by the support, wherein the laser head is movable along a predetermined head axis;

a driving mechanism for moving the laser head along the head axis;

a first torch member arranged in the laser head, wherein the first torch member moves integrally with the laser head;

a second torch member supported by the first torch member, wherein the second torch member moves relative to the first torch member along the head axis;

a laser beam emitting nozzle attached to one of the first torch member and the second torch member;

a converging lens arranged in the other of the first torch member and the second torch member, wherein a laser beam passage extends through the first and second torch members, and wherein a laser beam is transmitted through the laser beam passage, converged by the converging lens and emitted from the nozzle;

a braking mechanism provided between the first torch member and the second torch member to selectively lock the second torch member to the first torch member;

a lock mechanism for selectively engaging the second torch member to hold the second torch member at a predetermined position on the head axis, the lock mechanism including an actuator and a catch, wherein the actuator moves the catch toward and away from the second torch member, wherein the driving mechanism moves the laser head to adjust the distance between the converging lens and the nozzle when the catch has engaged the second torch member and when the braking mechanism has released the first torch member from the second torch member.

14. The laser cutting machine according to claim 13, wherein the first torch member includes an inner sleeve extending along the head axis, the second torch member includes an outer sleeve coaxially surrounding the inner sleeve, the nozzle is attached to one end of the outer sleeve, and the converging lens is fixed to the inner sleeve.

15. The laser cutting machine according to claim 13, wherein the first torch member includes an outer sleeve extending along the head axis, the second torch member includes an inner sleeve coaxially fitted within the outer sleeve, the nozzle is attached to one end of the outer sleeve, and the converging lens is fixed to the inner sleeve.

16. The laser cutting machine according to claim 13, wherein one of the first and second torch members includes an inner sleeve extending along the head axis, and the other includes an outer sleeve surrounding the inner sleeve, wherein the braking mechanism includes:

an annular chamber defined in the outer sleeve extending about the inner sleeve, wherein an actuating fluid is sent into the annular chamber;

a clamp arranged on the outer sleeve to grip the inner sleeve at a location corresponding to the annular chamber;

an annular piston arranged in the annular chamber, wherein the piston is moved by the actuating fluid in the annular chamber between a first position and a second position, wherein the piston engages the clamp when moved to the first position, which causes the clamp to grip the inner sleeve, and wherein the piston causes the clamp to release the inner sleeve when the piston is moved to the second position.

17. The laser cutting machine according to claim 16, wherein the clamp is a collet having a tapered surface that engages the piston.

18. The laser cutting machine according to claim 13 further comprising:

a gas supplying apparatus for supplying the interior of the nozzle with assist gas, the assist gas being discharged from the nozzle, wherein the pressure of the assist gas in the nozzle separates the nozzle and the converging lens from each other; and a pressure balancing mechanism arranged between the first and second torch members, wherein the balancing mechanism uses the assist gas to move the nozzle and the converging lens toward each other.

19. The laser cutting machine according to claim 18, wherein the pressure balancing mechanism includes:

a pressure chamber arranged in one of the first and second torch members, the assist gas being drawn into the pressure chamber from the gas supplying apparatus, wherein the pressure chamber has a pressure receiving surface for receiving the pressure of the assist gas; and a piston arranged in the pressure chamber and connected to the other of the first and second torch members, wherein the piston has a surface facing the pressure receiving surface.

* * * * *